US009590240B2

(12) United States Patent
Liu et al.

(10) Patent No.: US 9,590,240 B2
(45) Date of Patent: Mar. 7, 2017

(54) METAL/NON-METAL CO-DOPED LITHIUM TITANATE SPHERES WITH HIERARCHICAL MICRO/NANO ARCHITECTURES FOR HIGH RATE LITHIUM ION BATTERIES

(71) Applicant: Nano and Advanced Materials Institute Limited, Hong Kong (HK)

(72) Inventors: Chenmin Liu, Hong Kong (HK); Lifeng Cai, Hong Kong (HK); Shing Yan Choi, Hong Kong (HK)

(73) Assignee: NANO AND ADVANCED MATERIALS INSTITUTE LIMITED, Hong Kong (HK)

( * ) Notice: Subject to any disclaimer, the term of this patent is extended or adjusted under 35 U.S.C. 154(b) by 406 days.

(21) Appl. No.: 14/250,369

(22) Filed: Apr. 10, 2014

(65) Prior Publication Data
US 2014/0342228 A1    Nov. 20, 2014

Related U.S. Application Data

(60) Provisional application No. 61/855,341, filed on May 14, 2013.

(51) Int. Cl.
*C01G 23/00* (2006.01)
*H01M 4/36* (2006.01)
(Continued)

(52) U.S. Cl.
CPC .......... *H01M 4/366* (2013.01); *C01G 23/005* (2013.01); *H01M 4/485* (2013.01); *H01M 10/0525* (2013.01); *H01M 2004/027* (2013.01)

(58) Field of Classification Search
CPC ...... H01M 4/485; H01M 4/366; C01G 23/005
(Continued)

(56) References Cited

U.S. PATENT DOCUMENTS 6,645,673 B2    11/2003    Yamawaki et al.
8,277,683 B2    10/2012    Deng et al.
(Continued)

FOREIGN PATENT DOCUMENTS

CN    102610824 A       7/2012
CN    102820458    *  12/2012
(Continued)

OTHER PUBLICATIONS

European Search Report dated on Nov. 5, 2014 by European Patent Office.
(Continued)

*Primary Examiner* — Steven Bos
(74) *Attorney, Agent, or Firm* — Daniel R. Collopy

(57) ABSTRACT

The present invention is to provide a lithium titanate (LTO) material for a lithium ion battery. The LTO material has hierarchical micro/nano architecture, and comprises a plurality of micron-sized secondary LTO spheres, and a plurality of pores incorporated with metal formed by a metal dopant. Each of the micron-sized secondary LTO spheres comprises a plurality of nano-sized primary LTO particles. A plurality of the nano-sized primary LTO particles is encapsulated by a non-metal layer formed by a non-metal dopant. The LTO material of the present invention has high electrical conductivity for increasing the capacity at high charging/discharging rates, and energy storage capacity.

9 Claims, 13 Drawing Sheets

(51) Int. Cl.
*H01M 4/485* (2010.01)
*H01M 10/0525* (2010.01)
*H01M 4/02* (2006.01)

(58) Field of Classification Search
USPC ............ 429/219, 231.1, 220, 223, 224, 221, 429/231.3; 423/274; 428/403; 427/123
See application file for complete search history.

(56) References Cited

U.S. PATENT DOCUMENTS

| | | | |
|---|---|---|---|
| 2007/0148545 A1* | 6/2007 | Amine | B82Y 30/00 429/231.1 |
| 2011/0189545 A1 | 8/2011 | Holzapfel et al. | |
| 2011/0223491 A1 | 9/2011 | Xu et al. | |
| 2012/0244439 A1 | 9/2012 | Yu et al. | |
| 2013/0004850 A1 | 1/2013 | Shon et al. | |

FOREIGN PATENT DOCUMENTS

| | | | |
|---|---|---|---|
| CN | 102869612 A | | 1/2013 |
| CN | 103022461 A | | 4/2013 |
| CN | 103107321 A | | 5/2013 |
| CN | 10368229 | * | 3/2014 |
| EP | 2565161 A1 | | 3/2013 |

OTHER PUBLICATIONS

L. Kavan et al. Li insertion into Li4Ti5O12 (Spinel)—Charge capacity vs. particle size in thin-film electrodes, Journal of The Electrochemical Society, 150(7) A1000-A1007 (2003).
H. J. Luo et al. In situ growth of Li4Ti5O12 on multi-walled carbon nanotubes: novel coaxial nanocables for high rate lithium ion batteries, Journal of Materials Chemistry, 2011, 21, 761-767.
L. Kavan et al. Multi-walled carbon nanotubes functionalized by carboxylic groups: activation of TiO2 (anatase) and phosphate olivines (LiMnPO4; LiFePO4) for electrochemical Li-storage, Journal of Power Sources, 2010,195, 5360-5369.
B. B. Tian et al. Niobium doped lithium titanate as a high rate anode material for Li-ion batteries, Electrochemica Acta 55 (2010) 5453-5458.
L. Cheng et al. Carbon-coated Li4Ti5O12 as a high rate electrode material for Li-ion intercalation, Journal of The Electrochemical Society, 154(7) A692-A697 (2007).
D. Capsoni et al. Cr and Ni doping of Li4Ti5O12: cation distribution and functional properties, Journal of Physical Chemistry C, 2009, 113, 19664-19671.
J. S. Chen et al. Constructing hierarchical spheres from large ultrathin anatase TiO2 nanosheets with nearly 100% exposed (001) facets for fast reversible lithium storage, Journal of American Chemical Society, 2010, 132, 6124-6130.
L. F. Shen et al. In situ synthesis of high-loading Li4Ti5O12-graphene hybrid nanostructures for high rate lithium ion batteries, Nanoscale, 2011, 3, 572-574.
H. Liu et al. Highly ordered mesoporous NiO anode material for lithium ion batteries with an excellent electrochemical performance, Journal of Materials Chemistry, 2011,21, 3046-3052.
L. F. Shen et al. Facile synthesis of hierarchically porous Li4Ti5O12 microspheres for high rate lithium ion batteries, 2010, 20, 6998-7004.
S. Huang et al. Li4Ti5O12/Ag composite as electrode materials for lithium-ion battery, Solid State Ionics, 2006,177: 851-855.
W. Wang et al. Solid-state synthesis and electrochemical performance of Li4Ti5O12/(Ag+C) electrode material, Chinese Journal of Inorganic Chemistry, 2009, 25(12): 2151-2155.
L. F. Shen et al. Novel template-free solvothermal synthesis of mesoporous Li4Ti5O12—C microspheres for high power lithium ion batteries, Journal of Materials Chemistry, 2011, 21, 14414-14416.
L. F. Tang et al. Template-free synthesis of mesoporous spinel lithium titanate microspheres and their application in high-rate lithium ion batteries, Journal of Materials Chemistry, 2009, 19: 5980-5984.
J. Haetge et al. Ordered large-pore mesoporous Li4Ti5O12 spinel thin film electrodes with nanocrystalline framework for high rate rechargeable lithium batteries: relationships among charge storage, electrical conductivity, and nanoscale structure, Chemistry of Materials, 2011, 23: 4384-4393.
First Office Action with Search Report of CN201410199581.6 issued by the State Intellectual Property Office of China on Dec. 2, 2015.

* cited by examiner

METAL/NON-METAL CO-DOPED LITHIUM TITANATE SPHERES WITH HIERARCHICAL MICRO/NANO ARCHITECTURES FOR HIGH RATE LITHIUM ION BATTERIES

CROSS REFERENCE TO RELATED APPLICATION

Pursuant to 35 U.S.C. §119(e), this is a non-provisional patent application which claims benefit from U.S. provisional patent application Ser. No. 61/855,341 filed May 14, 2013, and the disclosure of which is incorporated herein by reference.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a lithium-ion battery, and particularly relates to anode materials for a lithium-ion battery, and methods for fabricating said anode materials.

BACKGROUND

Lithium ion batteries (LIBs) have attracted a great deal of attention as potential replacements for conventional gasoline- or diesel-powered internal combustion engines. As an improved anode material for LIBs, lithium titanate oxide, $Li_4Ti_5O_{12}$ (LTO) has good characteristics in terms of safety because of its stable structure during charging/discharging and its inertness towards the formation of solid-electrolyte interphase (SEI) on LTO surface.

Furthermore, LTO is a promising anode material for certain niche applications requiring high rate capability and long cycle life, and offers advantages in terms of power and chemical stability. A disadvantage of LTO is its poor electronic conductivity that limits its full capacity at high charge-discharge rates. The increase in electronic conductivity of LTO can facilitate higher-rate operability of LTO anodes.

It is well-known in the art that shorter diffusion lengths for Li+ ions and electronic transport in nanoparticles improve the high-rate performance of lithium battery anodes. The morphology of LTO has also been regarded as a critical factor in lithium intercalating activity and cycling stability of the electrode materials.

Most of the conventional LTO materials are now synthesized by solid reaction method which needs to be heated at high temperature (typically 700-900° C.) for a long time, and the method is energy-consuming. What is more, this method fails to control the particle size and morphology. On the other hand, nanomaterials can be fabricated using various template precursors, such as AAO, triblock copolymers, porous silica and polystyrene spheres. These preparation methods often require removal of the templates after synthesis that may damage the desired configuration of the nanomaterials and make the synthesis process become more complicated.

As an improved anode material for LIBs, LTO shows extremely flat discharge and charge plateaus at about 1.55 V (vs. Li/Li+) and zero-strain insertion characteristics, as well as excellent lithium ion mobility, so LTO entirely eliminate potential safety issues and exhibit excellent cycling performance. Nevertheless, its low electronic conductivity ($<10^{-11}$ S/m) results in poor rate performance. Many approaches have been developed to overcome its poor electronic conductivity, such as surface coatings with conductive material.

Recently, nanostructured LTO is expected to exhibit improved rate performance because of the shorter transport path lengths of lithium ions and electrons. The mesoporous structured materials offer fast ion/electron transfer and sufficient contact interface between active materials and electrolyte, resulting in high Li storage capacity and high rates of insertion.

Novel mesoporous structured materials constituted by "nano-size" LTO combined with "coating with conductive carbon" are ideal materials possessing rapid electronic and ionic transport.

However, the conductivity of the carbon coated LTO material is still not high enough, and the fabrication of nanosized particles with a mesoporous structure is still a challenge through using solid state reaction or sol-gel methods. Recently, the solution-phase route has been regarded as a feasible way to control the particle size and shape.

Conventionally, lithium titanate is obtained from titanium dioxide as a starting material. In order to prepare an electrode material having excellent characteristics, titanium dioxide, as a starting material of lithium titanate, plays an important role. Between a lithium precursor and a titanium precursor, which are the starting materials of lithium titanate, more considerations are needed for the titanium precursor in terms of the type and amount of an element used, and the corresponding composition ratio since the titanium precursor affects battery performance more than those of the lithium precursor. When high-purity titanium dioxide is used as a precursor of lithium titanate, many problems including high manufacturing costs may occur.

CN102610824 discloses a method for preparing nano-scaled LTO/Ag composite for anode material of the lithium-ion battery. The Ag doping is simultaneously carried out to modify the nano-scaled LTO to improve the conductivity of the lithium titanate. The chemical ingredients and the grain diameters of the lithium titanate are controlled through hydrothermal treatment, for reducing the temperature during preparation, and preventing the grain agglomeration. Nevertheless, the Ag is usually not well distributed within the lithium titanate, leading to low electrical conductivity.

CN103022461 discloses a rare-earth metal doped micro-nanoscaled lithium titanate anode material for providing large rate discharge characteristic. The molecular formula of the lithium titanate is $Li_xM_pTi_yO_z$, in which M represents doped rare-earth metal ions. By adopting spherical titanium dioxide as an initial raw material and using water or ethanol as reaction agent, the preparation method is achieved by hydrothermal reaction and calcination. Nevertheless, the rare-earth materials are expensive, thereby increasing substantially the manufacturing cost.

Consequently, there is an unmet need for a LTO material providing high conductivity for increasing the capacity at high charging/discharging rates, and high energy storage capacity.

SUMMARY OF THE INVENTION

Accordingly, a first aspect of the presently claimed invention is to provide a metal/non-metal co-doped LTO material for Li-ion battery.

In accordance with an embodiment of the presently claimed invention, the metal/non-metal co-doped LTO material comprises a plurality of micron-sized secondary LTO spheres, and a plurality of pores incorporated with a metal formed by a metal dopant. Each of the micron-sized secondary LTO spheres further comprises a plurality of nano-sized primary LTO particles. One or more of the nano-sized primary LTO particles are encapsulated by a non-metal layer formed by a non-metal dopant.

A second aspect of the presently claimed invention is to provide a method for fabricating the metal/non-metal co-doped LTO material.

In accordance with an embodiment of the presently claimed invention, the method for fabricating the metal/non-metal co-doped LTO material comprises the steps of: mixing a titanium (Ti) containing precursor, a lithium (Li) containing precursor, and a non-metal dopant precursor in a solvent to form a mixture; heating the mixture through a hydrothermal process under a pressure ranging from 1.5 to 5 atm, and a heating temperature ranging from 120 to 200° C. to form nano-sized primary LTO particles, wherein one or more of the nano-sized primary LTO particles are encapsulated by a non-metal layer formed by a non-metal dopant; calcinating the nano-sized primary LTO particles at a first calcination temperature ranging from 450 to 750° C. to form micron-sized secondary LTO spheres; immersing the micron-sized secondary LTO spheres into a metal dopant containing solution to incorporate a metal dopant into the micron-sized secondary LTO spheres; drying the micron-sized secondary LTO spheres incorporated with the metal dopant in vacuum; and calcinating the micron-sized secondary LTO spheres incorporated with the metal dopant at a second calcination temperature ranging from 450 to 750° C. to form the LTO material.

The presently claimed LTO material is also used in the preparation of a anode slurry composition for fabricating the anode of Li-ion battery.

The present invention provides a LTO material having high conductivity for increasing the capacity at high charging/discharging rates, and energy storage capacity. In addition, the present invention provides a relatively mild (<550° C.) synthetic method to introduce metal into the LTO nanostructures to make the LTO more electrically conductive. What is more, the mild hydrothermal process in solution can well control the hierarchical micro/nano architecture of the LTO material.

BRIEF DESCRIPTION OF THE DRAWINGS

Embodiments of the present invention are described in more detail hereinafter with reference to the drawings, in which.

DETAILED DESCRIPTION OF PREFERRED EMBODIMENTS

In the following description, LTO materials for Li-ion batteries, and the corresponding embodiments of the fabrication method are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

As used herein, the micron-sized secondary LTO sphere is defined as the LTO sphere having spherical, or any other regular or irregular shape.

According to an embodiment of the presently claimed invention, the metal/non-metal co-doped LTO material has hierarchical micro/nano architecture. The metal/non-metal co-doped LTO material comprises a plurality of micron-sized secondary LTO spheres, and a plurality of pores. Each of the micron-sized secondary LTO spheres is accumulated by a plurality of nano-sized primary LTO particles. A plurality of nano-sized primary LTO particles is encapsulated by a non-metal layer formed by a non-metal dopant. A metal, formed by a metal dopant, is incorporated into the pores of the LTO materials. Preferably, the sizes of the nano-sized primary LTO particles are in the range of 5 to 20 nm; the sizes of the micron-sized secondary LTO spheres are in the range of 1 to 5 μm; the pore diameters of the LTO material are in the range of 10 to 100 nm. Such that the LTO material provides better electrical conductivity. Preferably, the metal/non-metal co-doped LTO material comprises 0.5-10 wt % of metal dopant and/or 0.5-30 wt % of non-metal dopant to provide better electrical conductivity.

Figure 1:
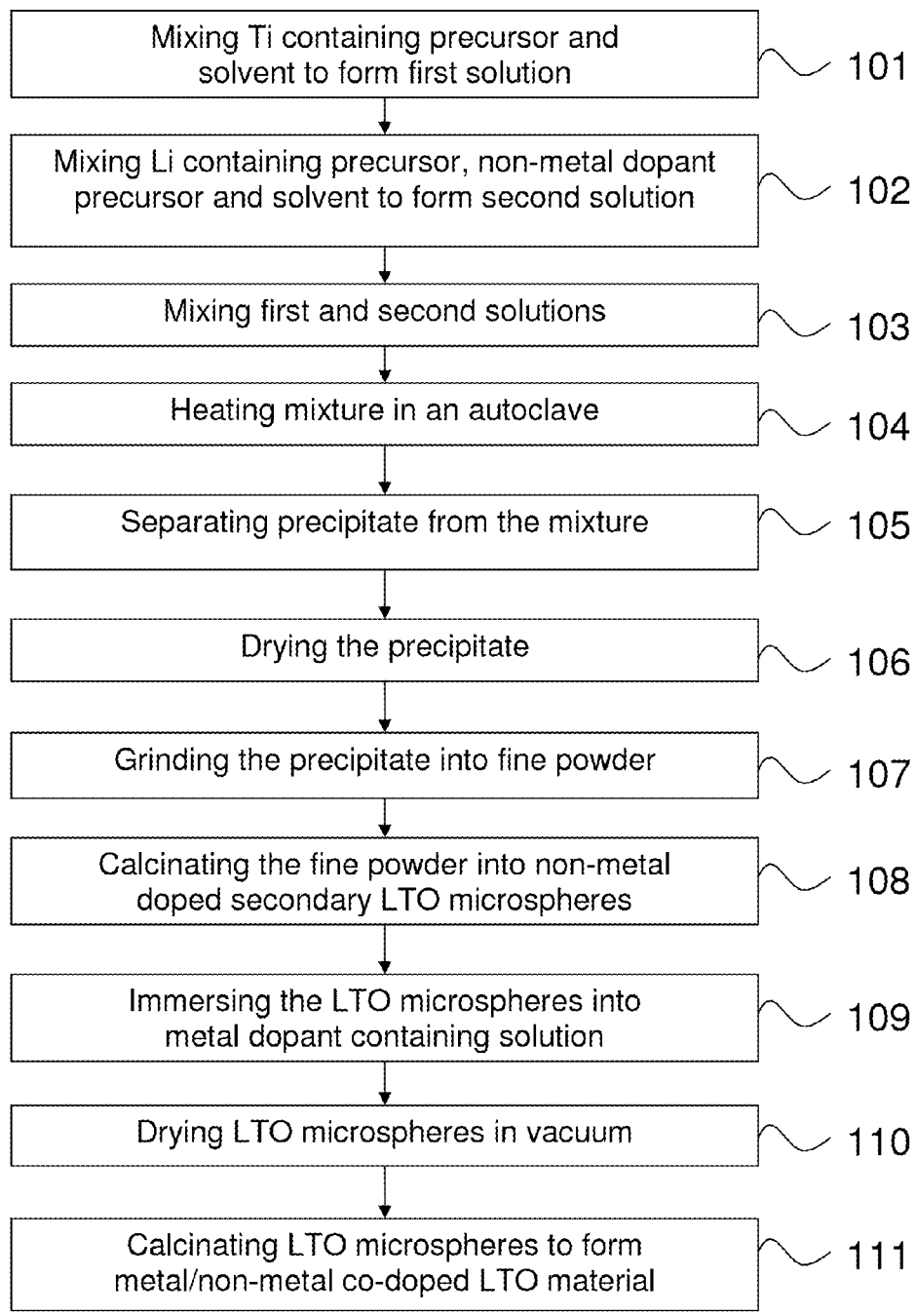
FIG. 1 is a flowchart showing the steps of a method for fabricating a LTO material according to an embodiment of the presently claimed invention.

FIG. 1 is a flowchart showing the steps of a method for fabricating the metal/non-metal co-doped LTO material according to an embodiment of the presently claimed invention. In step 101, a Ti containing precursor and a solvent are mixed to form a first solution. In step 102, a Li containing precursor, a non-metal dopant source and the solvent are mixed to form a second solution. In step 103, the first solution and the second solution are mixed under stirring. Preferably, the mixture of the first solution and second solution comprises 1-7 wt % of Ti containing precursor, 4-10 wt % of the Li containing precursor, and 80-92 wt % of the solvent, and 1-10 wt % of the non-metal dopant source. In step 104, the mixture of the solutions A and B is heated in a TEFLON-lined autoclave through a hydrothermal process until a desired amount of precipitate is formed. Preferably, the heating temperature is in the range of 120 to 200° C., the pressure is in the range of 1.5 to 5 atm, and the heating time is 12-36 hrs. In step 105, the precipitate, comprising non-metal doped nano-sized primary LTO particles, is separated from the mixture by centrifugation, and is further washed with deionized water. In step 106, the separated precipitate is then dried at a drying temperature ranging from 70 to 100° C. for 4-8 hrs. In step 107, the dried precipitate is grinded into fine powder. In step 108, the fine powder is calcinated in a tube furnace under nitrogen atmosphere at a calcination temperature ranging from 450 to 750° C. for 2-8 hrs to form non-metal doped secondary LTO microspheres. Preferably, the fine powder is heated with a heating rate in the range of 0.5 to 5° C./min till reaching the desired calcination temperature. In step 109, the non-metal doped secondary LTO microspheres are immersed into a metal dopant containing solution until sufficient metal dopant is incorporated. In step 110, the non-metal doped secondary LTO microspheres also incorporated with the metal ions are dried in vacuum at a drying temperature ranging from 70 to 100° C. In step 111, the vacuum dried non-metal doped secondary LTO microspheres also incorporated with the metal dopant are calcinated in a tube furnace under nitrogen atmosphere at a calcination temperature ranging from 450 to 750° C. for 2-8 hrs to form metal/non-metal co-doped LTO material. The heating rate is in the range of 0.5 to 5° C./min till reaching the desired calcination temperature.

Preferably, the metal/non-metal co-doped LTO material comprises 0.5-10 wt % of one or more metal dopants. The metal dopant can be silver, copper, nickel, cobalt, manganese, gold, platinum, iron, or tin.

Preferably, the metal/non-metal co-doped LTO material comprises 0.5-30 wt % of one or more metal dopants. The non-metal dopant can be carbon, nitrogen, or fluorine.

According to the present invention, the hierarchical micro/nano architecture is important for improving the electrical performance of the LTO material. As the nano-sized primary LTO particles are able to shorten the electron travelling distance in the particles, the resistance in the single particle can be lowered down. In addition, the larger aggregation of the nano-sized primary LTO particles provides a continuous electron pathway to further improve the conductivity in the whole structure of the LTO material. Additionally, the high surface area of the nano-sized primary LTO particles also provides high activity of the whole structure.

In the hydrothermal process, the nano-sized primary LTO particles are firstly formed. In the subsequent calcination processes, the hierarchical structure is then formed. The parameters, including the chemical ratio, pressure, and heating temperature of the hydrothermal process, and the temperature of the subsequent calcination processes can affect the final structure of the LTO material.

The metal dopants incorporated within the pores of the co-doped LTO material are able to enhance the electrical conductivity among the nano-sized primary LTO particles and the micron-sized secondary LTO spheres. In addition, as the nano-sized primary LTO particles are encapsulated by the non-metal dopant layer, the electrical conductivity of the nano-sized primary LTO particles is further enhanced.

Figure 2A:
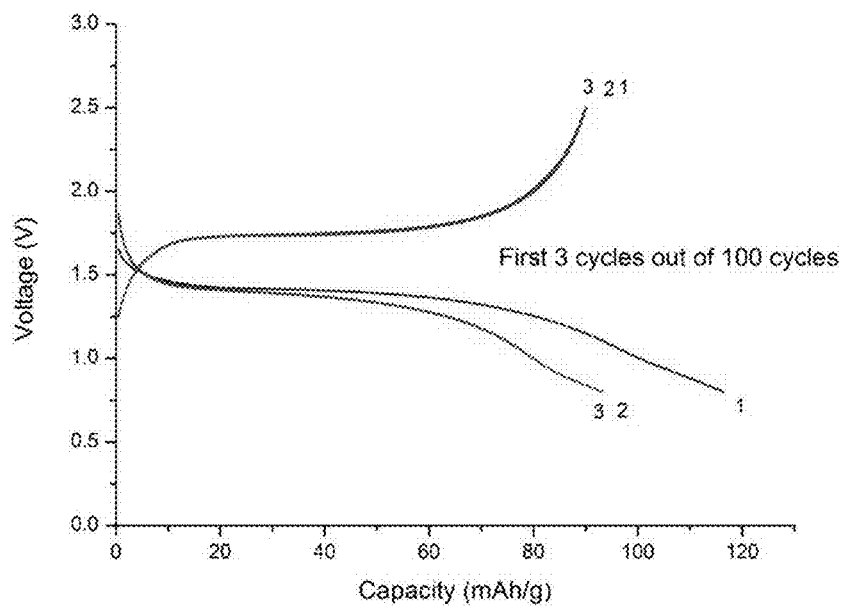
FIG. 2A-B shows the electrical performances regarding the charge/discharge capacity between an Ag doped LTO material and an Ag/C co-doped LTO material respectively according to an embodiment of the presently claimed invention.
Figure 2B:
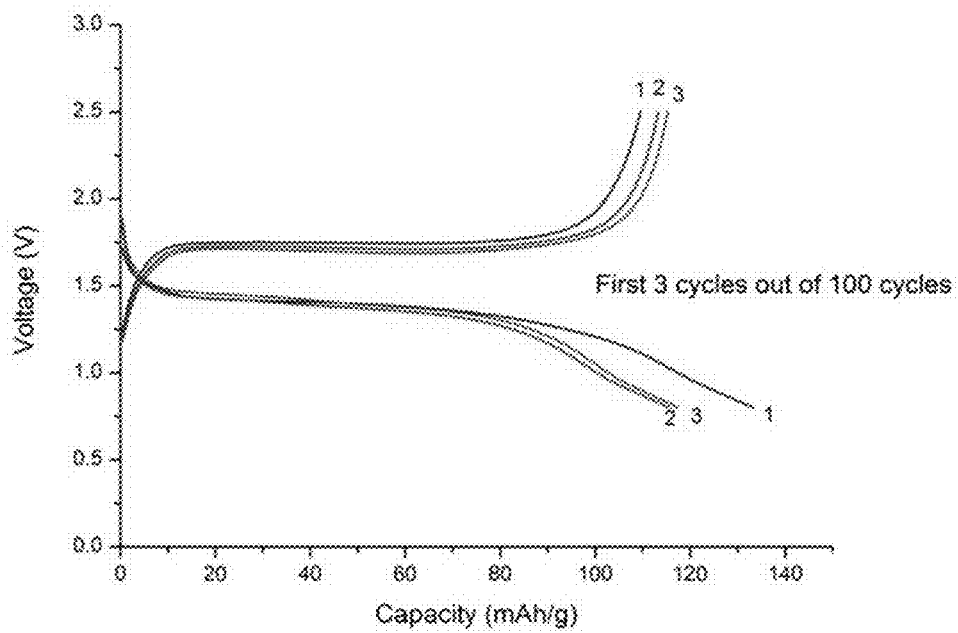

FIG. 2A-B show the electrical performances regarding the charge/discharge capacity between a silver (Ag) doped LTO material and a silver/carbon (Ag/C) co-doped LTO material respectively according to an embodiment of the presently claimed invention. The Ag doped LTO material has discharge capacity of about 118 mAh/g as shown in FIG. 2A, while the Ag/C co-doped LTO material has discharge capacity of about 133 mAh/g as shown in FIG. 2B. After carbon doping, both of the capacity and the efficiency of the LTO material are increased.

To prepare an anode slurry composition for fabricating the anode of a lithium-ion battery, the metal/non-metal co-doped LTO material of the present invention (30-90%), carbon black (Super P) (5-20%) and polymer binder (10-50%) are homogenously mixed in a solvent. The polymer binder can be polyvinylidene fluoride (PVDF), sodium carboxymethyl cellulose (CMC), sodium alginate, or a combination thereof. The solvent can be N-Methyl pyrrolidinone (NMP), ethanol, water, or a combination thereof.

The anode slurry can be ball milled in a condition ball miller (Frisch Planetary Micro Mill PULVERISETTE 7 premium line) and mixed in a condition mixer (AR-100, Thinky) The slurry is coated uniformly on a copper or aluminum foil. Finally, the electrode is dried in air at 60° C. for 1 hour and under vacuum at 110° C. for 12 hours. The electrode is cut into circular pieces.

Pressure (0-10 MPa) is applied to the electrodes to further enhance the electrical conductivity. Cell assembly is carried out in an argon-filled glove box (M. Braun Co., [O]<0.5 ppm, {H2O}<0.5 ppm). The coin cells are cycled under different current densities between cutoff voltages of 2.5 and 0.8V on a cell test instrument (Arbin Instruments).

EXAMPLE 1

1.92 g tetrabutyl titanate was dissolved in 48 ml anhydrous ethanol under stirring to form a solution A. 4.0 g Lithium acetate dihydrate and 1.6 ml Furfural were dissolved in 48 ml anhydrous ethanol using a magnetic stirrer to form a solution B. The above two solution were mixed under stirring for 10 minutes. And then it was transferred into a TEFLON-lined autoclave and kept at a pressure of 1.5 to 5 atm and 180° C. for 24 hours. The resulting precipitate was separated by centrifugation, and washed 3 times with deionized water. The precipitate was dried at 80° C. for 6 hrs. The precipitate was grinded into fine powder and calcinated at 600° C. for 4 hr in a tube furnace under nitrogen atmosphere to obtain C-doped LTO microspheres with a heating rate of 1° C./min. Then the as-prepared powder of C-doped LTO microspheres were immersed in 2.5 wt % of silver nitrate, $AgNO_3$ DI water solution and followed by stirring and vacuum drying at 80° C. The powder was calcinated at 600° C. for 4 hr in a tube furnace under nitrogen atmosphere to obtain Ag/C co-doped LTO material with a heating rate of 1° C./min.

The charge and discharge capacities were measured with coin cells in which a lithium metal foil was used as the counter electrode. The electrolyte employed was 1M solution of $LiPF_6$ in ethylene carbonate, ethylmethyl carbonate and dimethyl carbonate (EC+EMC+DMC) (1:1:1 in volume). The active materials powder (80%), Super P (10%) and polyvinylidene fluoride (PVDF) binder (10%) were homogenously mixed in N-Methyl pyrrolidinone (NMP) solvent (PVDF:NMP=1:15) in the condition mixer (AR-100, Thinky) The slurry was coated uniformly on copper and aluminum foil. Finally, the electrode was dried in air at 60° C. for 1 hour and under vacuum at 110° C. for 12 hours. Electrode was cut into circular pieces. Half of them are compressed (Cu: 8 MPa and Al: 2 MPa) and the rest of them are remain uncompressed. Cell assembly was carried out in an argon-filled glove box (German, M. Braun Co., [O]<0.5 ppm, {H2O}<0.5 ppm). The coin cells were cycled under different current densities between cutoff voltages of 2.5 and 0.8V on a cell test instrument (Arbin instruments).

Figure 3:
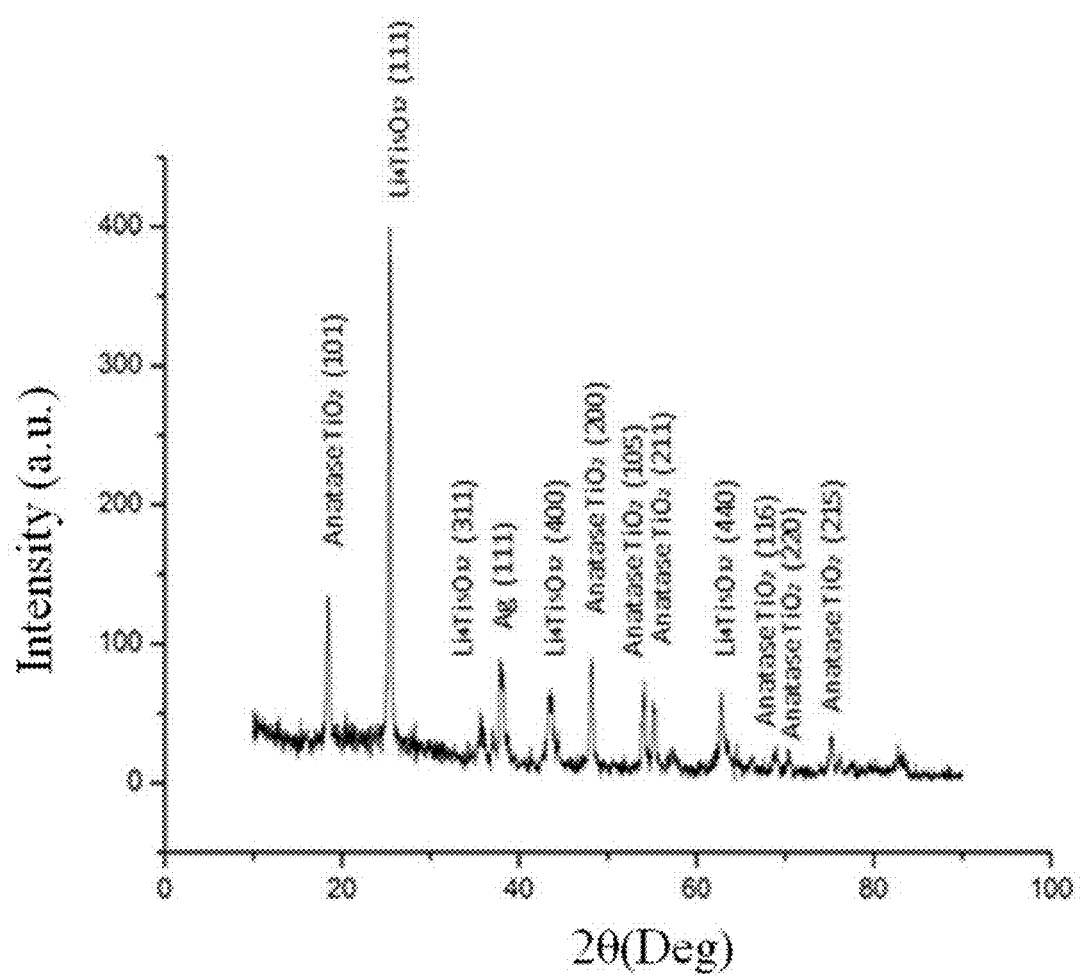
FIG. 3 is a X-ray diffraction (XRD) spectrum of the Ag/C co-doped LTO microspheres of the example 1 of the presently claimed invention.

FIG. 3 is a XRD spectrum of the Ag/C co-doped LTO microspheres of the example 1. It is indicated in the XRD result that the as-synthesized doped LTO microspheres are mostly composed of $Li_4Ti_5O_{12}$. Besides, small amount of anatase-$TiO_2$ and Ag is also found on the XRD spectrum. The anatase-$TiO_2$ may also contribute to the rate-capability of the LTO material.

Figure 4A:
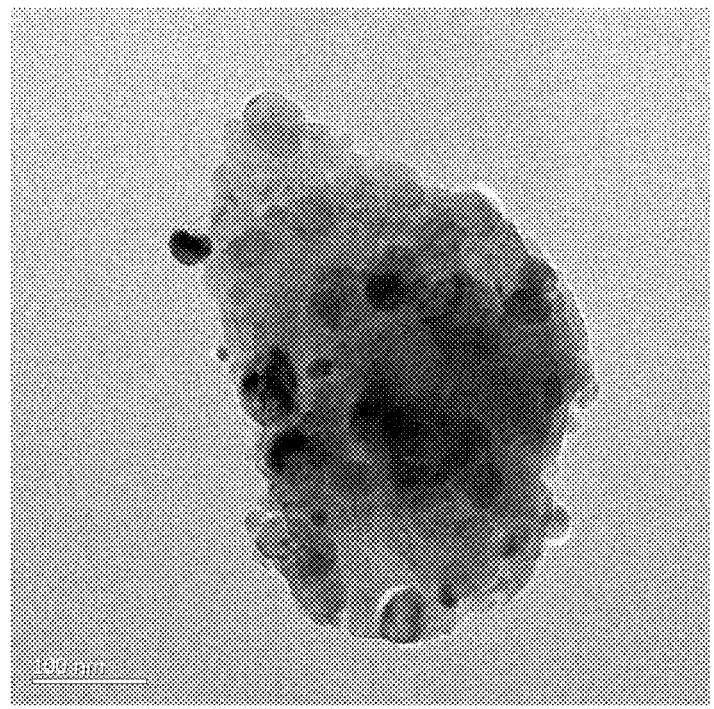
FIG. 4A-D are the transmission electron microscopy (TEM) images of the Ag/C co-doped LTO microspheres of the example 1.
Figure 4B:
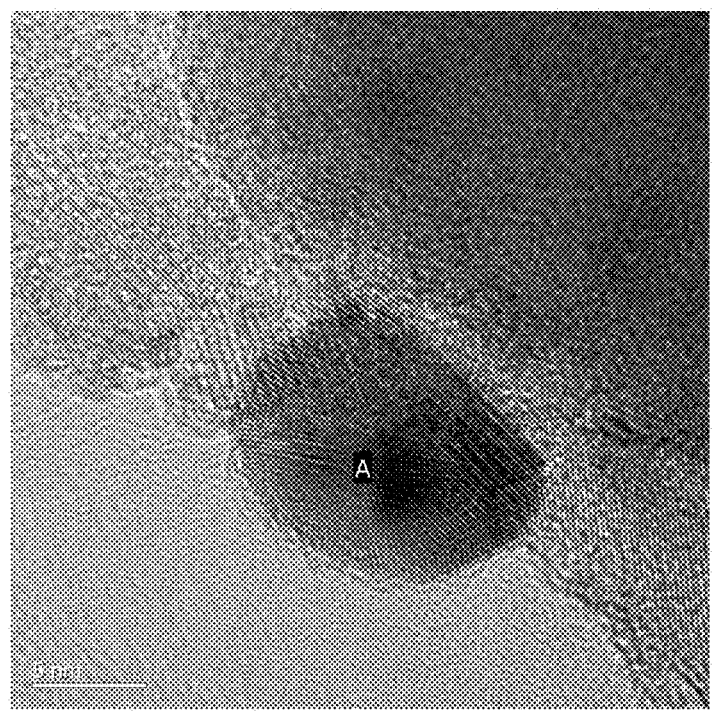
Figure 4C:
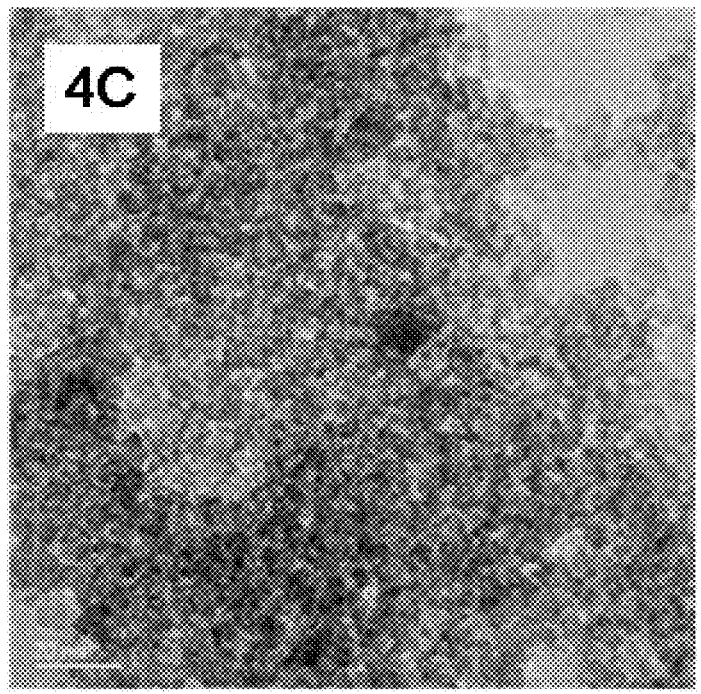
Figure 4D:
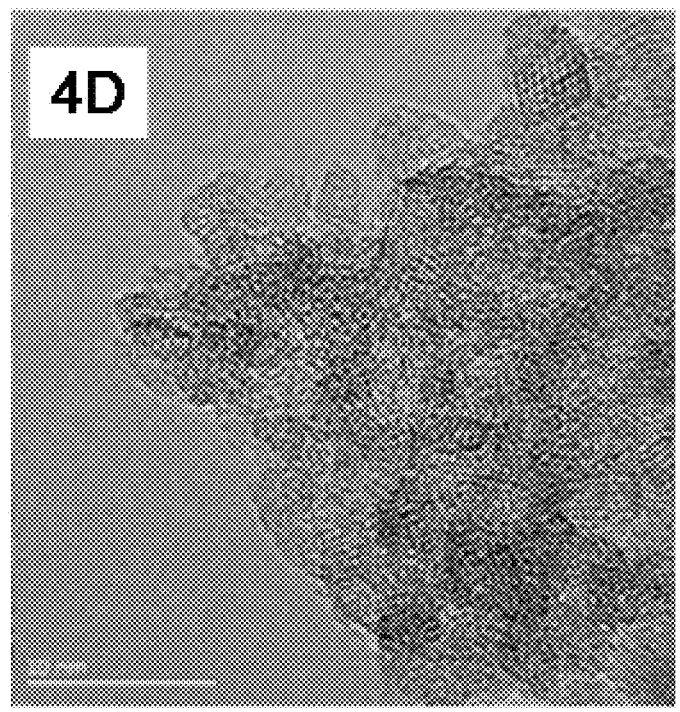
Figure 4E:
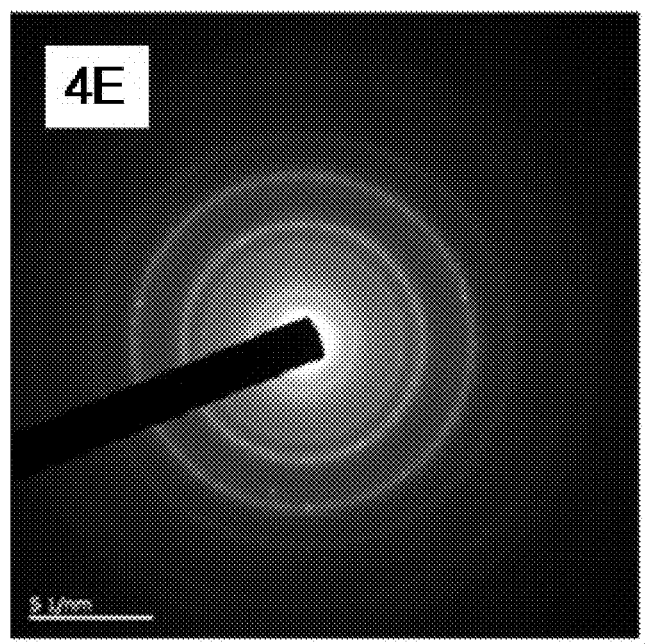
FIG. 4E is a selected area electron diffraction (SAED) pattern of the Ag/C co-doped LTO microspheres of the example 1.
Figure 5:
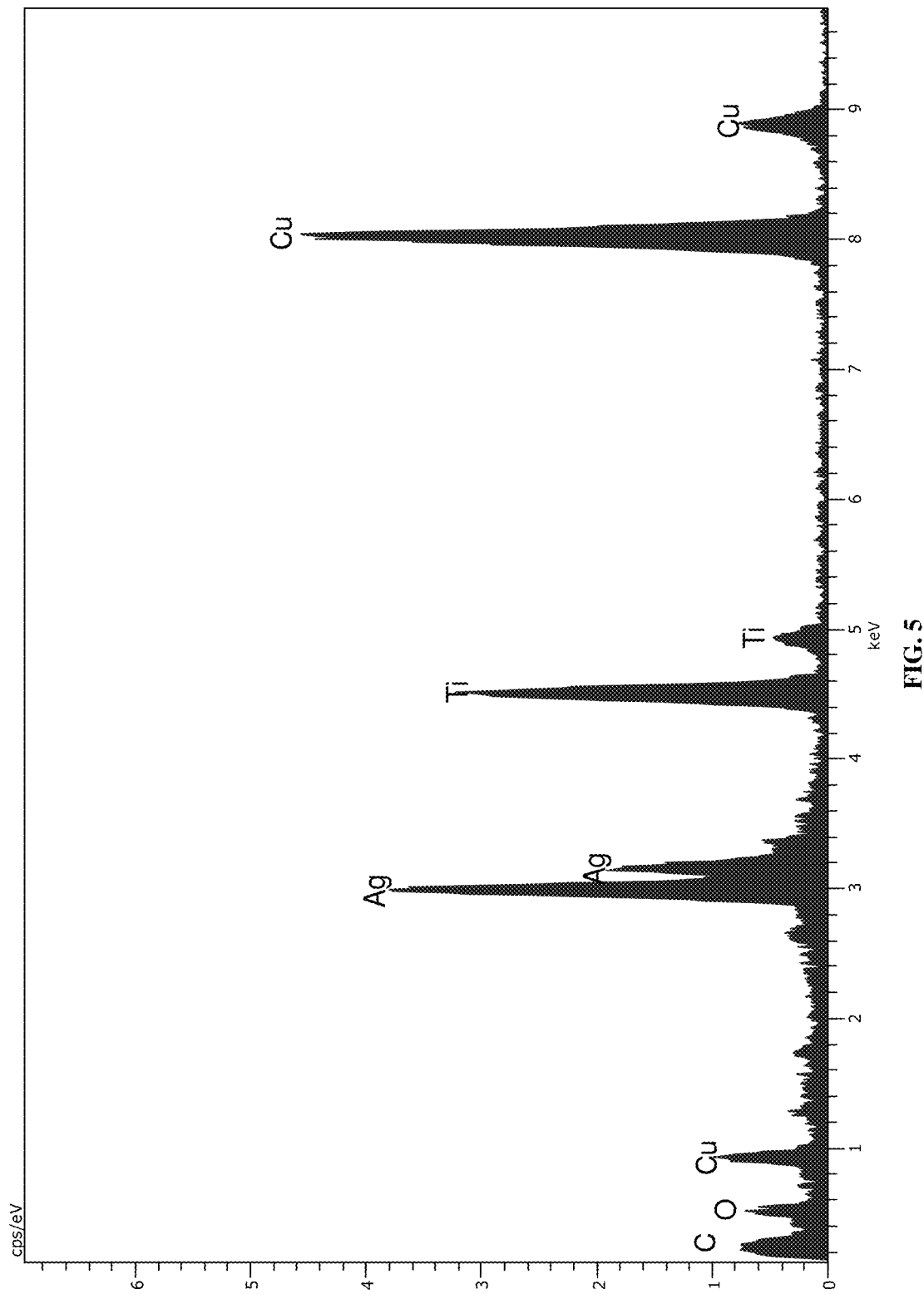
FIG. 5 is the energy-dispersive X-ray (EDX) spectroscopy of the Ag/C co-doped LTO microspheres of the example 1.

FIG. 4A-D are the TEM images of the Ag/C co-doped LTO microspheres. FIG. 4A shows a single Ag/C co-doped secondary LTO microsphere with a diameter of about 0.5 μm. FIG. 4B show an Ag nanodopant (marked with A in the figure) in the LTO microsphere. FIG. 4C shows an enlarged TEM image of the LTO products. FIG. 4D shows the porous structure of the LTO product. FIG. 4E shows a selected area electron diffraction pattern of the LTO product, which shows the good crystal structure of the doped LTO product. The microspheres are accumulated by nano-sized primary LTO particles encapsulated by carbon layer. The existence of C and Ag are also demonstrated by the result of EDX as shown in FIG. 5. The presence of C and Ag effectively improves the electronic conductivity of the LTO material.

Figure 6:
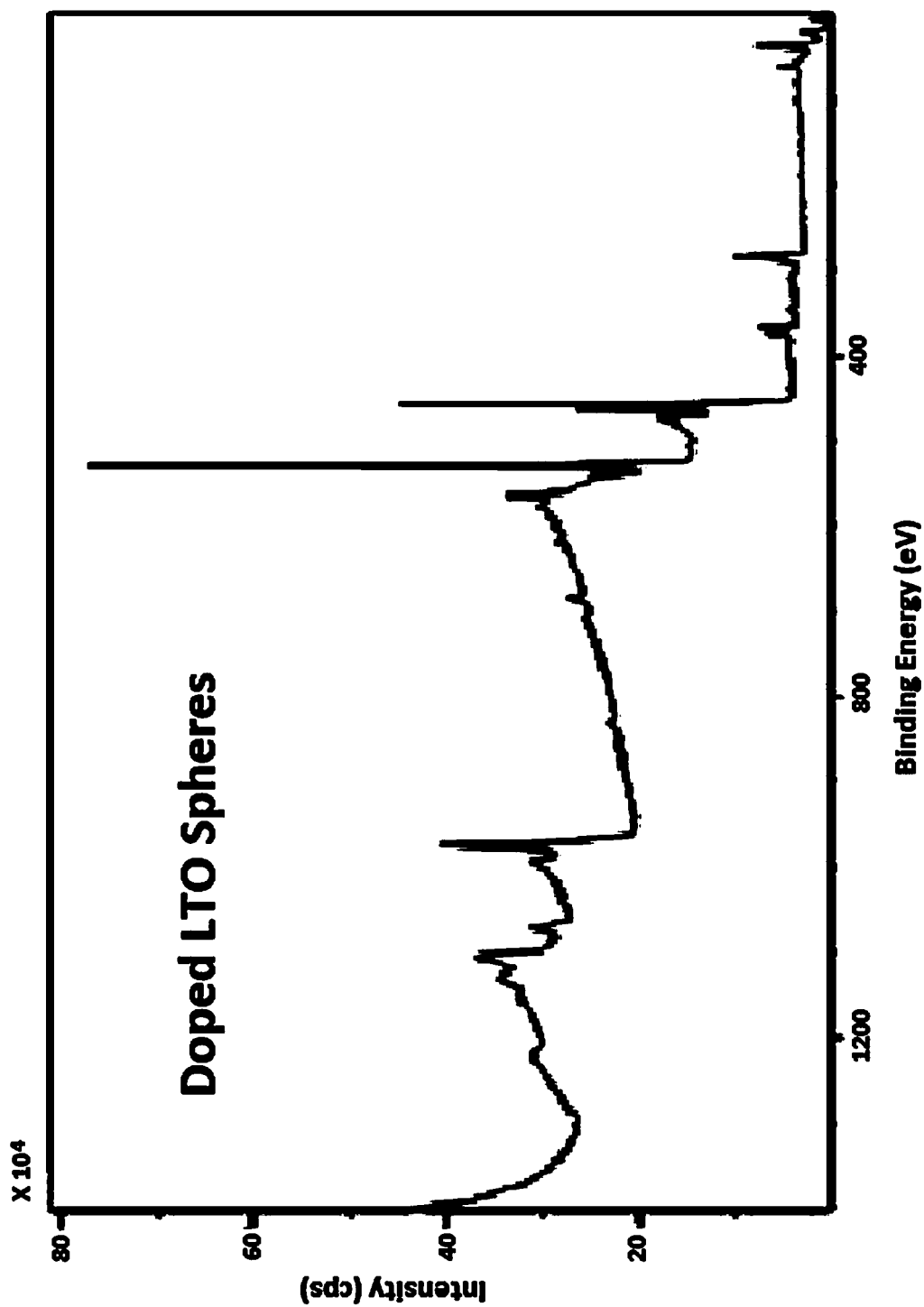
FIG. 6 is the X-ray photoelectron spectrum (XPS) of the Ag/C co-doped LTO microspheres of the example 1.
Figure 6:
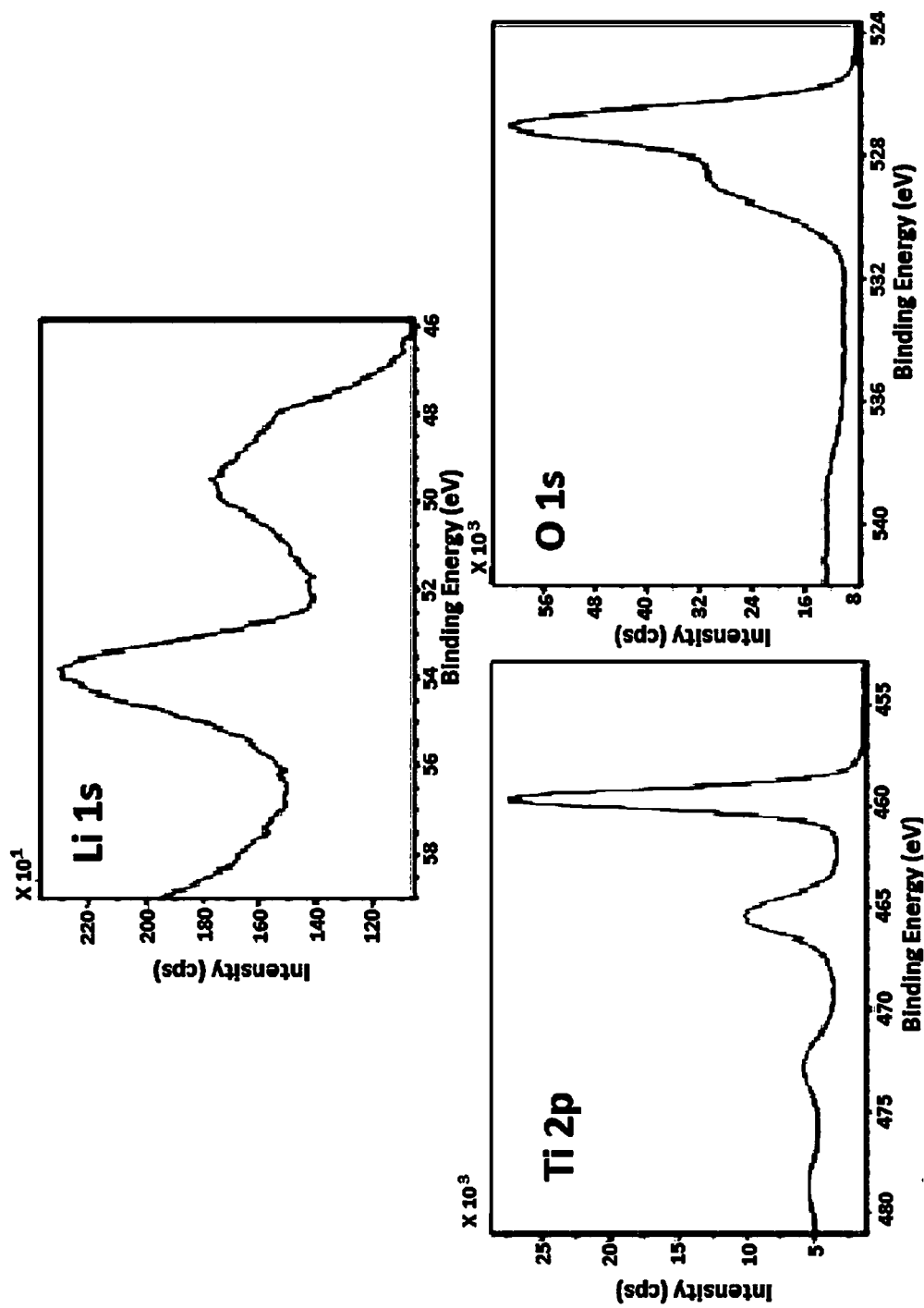
Figure 6:
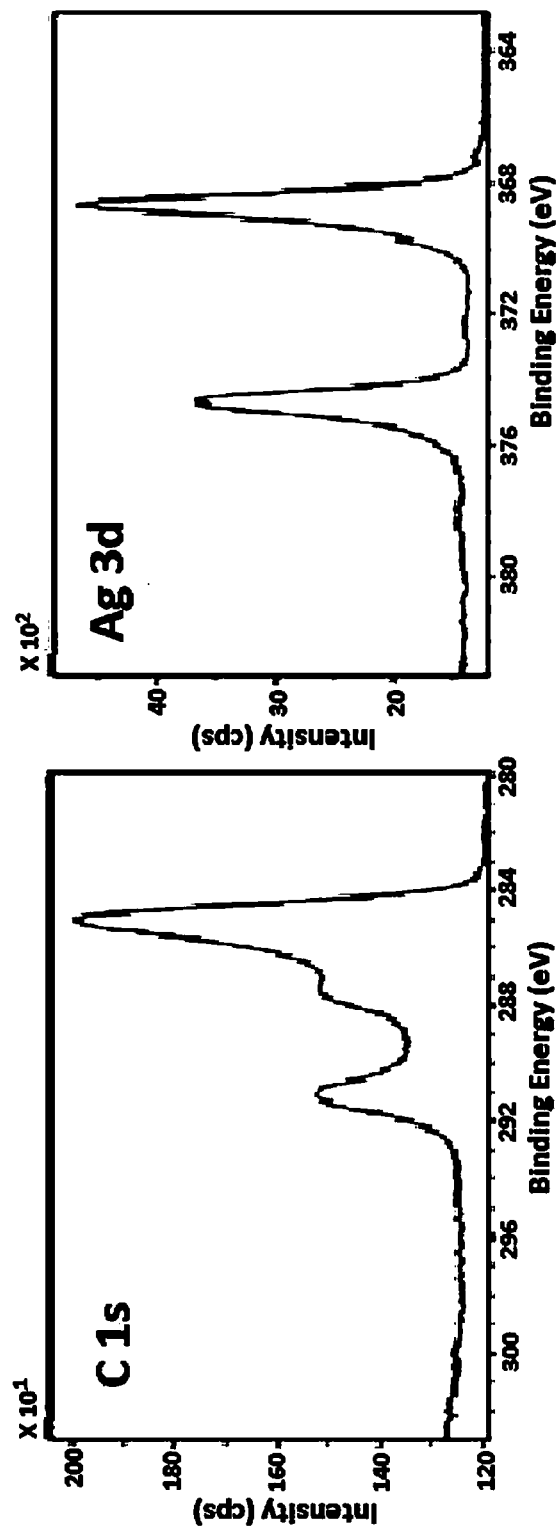

FIG. 6 shows the XPS result of the Ag/C co-doped LTO microspheres. There are obvious binding energy peaks of oxygen, titanium, carbon, lithium and sliver appeared on the XPS results, which reveal the detailed composition of the as-synthesized doped LTO microspheres.

Figure 7A:
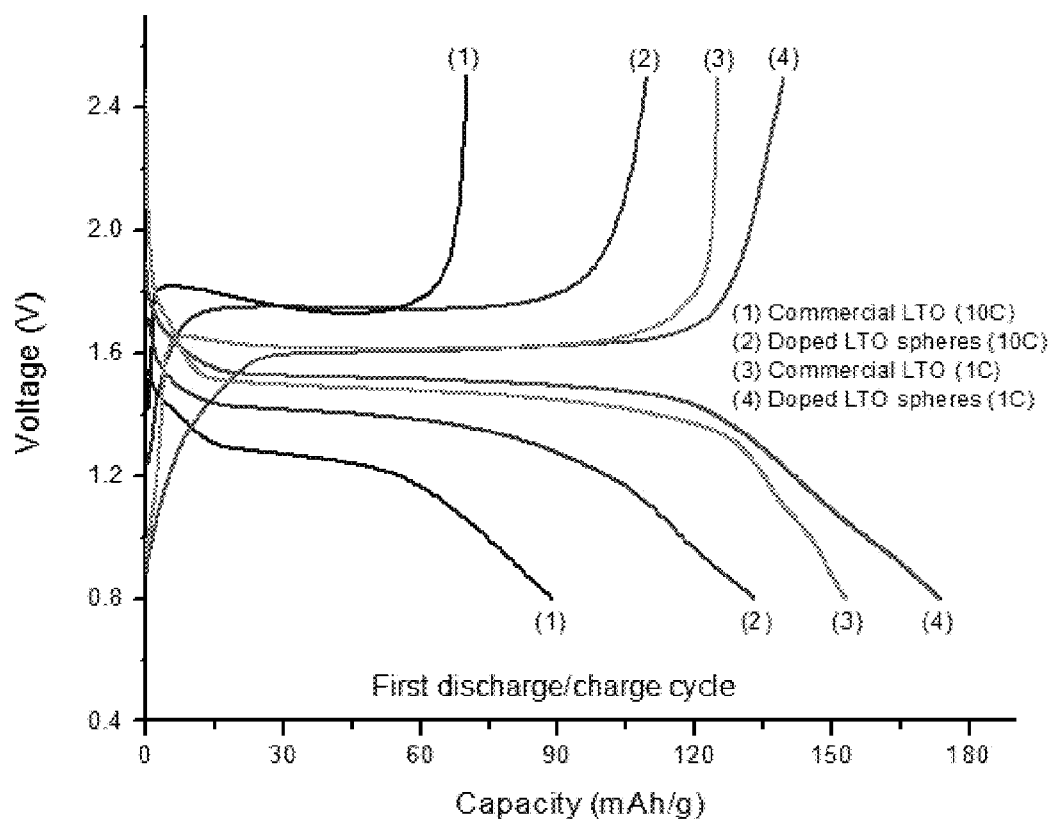
FIG. 7A shows the electrochemical performance regarding charge/discharge capacity between the Ag/C co-doped LTO microspheres of the example 1, and a commercial LTO material respectively.

The electrochemical properties of as-synthesized doped LTO material and a commercial non-doped LTO material (Hefei Kejing Materials Technology Co. Ltd.) were evaluated and compared. FIG. 7A shows the electrochemical performance of the Ag/C co-doped LTO material and the commercial LTO material. The discharge/charge profiles of the Ag/C co-doped LTO material and the commercial LTO material cycled under different current density (1 C and 10 C) between the voltage limits of 0.8V and 2.5V are shown. At the initial lower rate of 1 C, the Ag/C co-doped doped LTO material gives a discharge capacity of 173.7 mAh/g whereas the commercial LTO material only gives 153.2 mAh/g. Facile lithium ion diffusion through the nanosized primary LTO particles and fast electron transport through the carbon and sliver contribute to the higher lithium storage capacity. Even when the current was increased to a rate of 10 C, the discharge capacity of Ag/C co-doped LTO material can also reach 133 mAh/g, which is higher than that of the commercial LTO material.

Figure 7B:
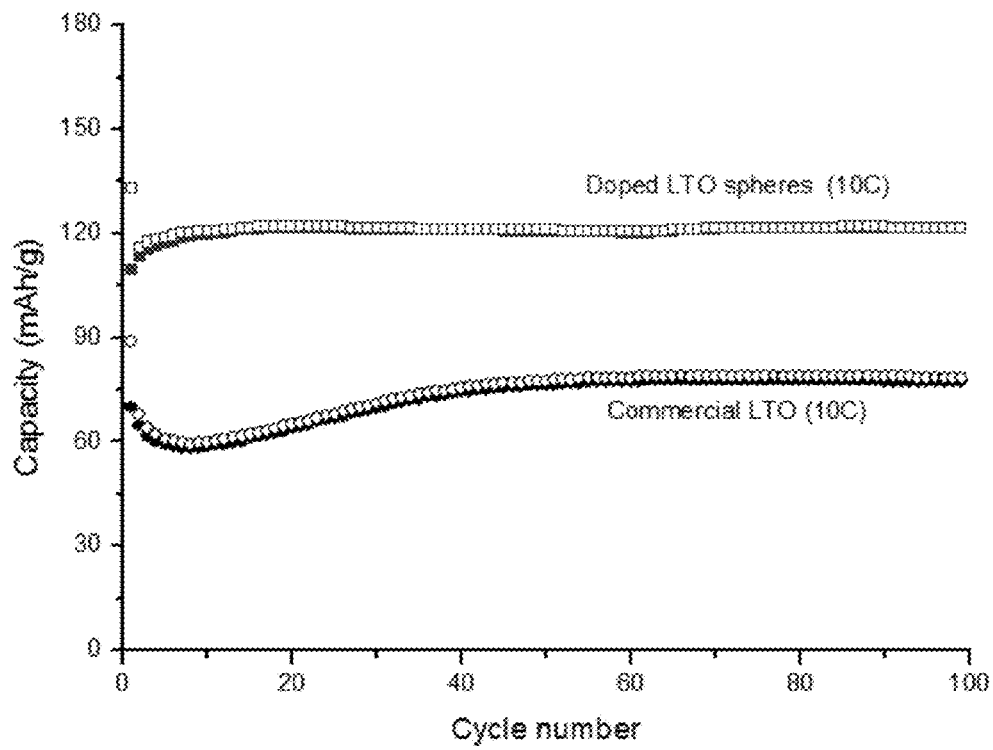
FIG. 7B shows the electrochemical performance regarding cycling stability between the Ag/C co-doped LTO microspheres of the example 1, and the commercial LTO material respectively.

FIG. 7B shows the electrochemical performance regarding cycling stability between the Ag/C co-doped LTO material and the commercial LTO material respectively. The cycling stability test was performed under charging/discharging condition. Compared to the commercial LTO, the Ag/C co-doped LTO material exhibits good cycling stability at a rate of 10 C.

Figure 7C:
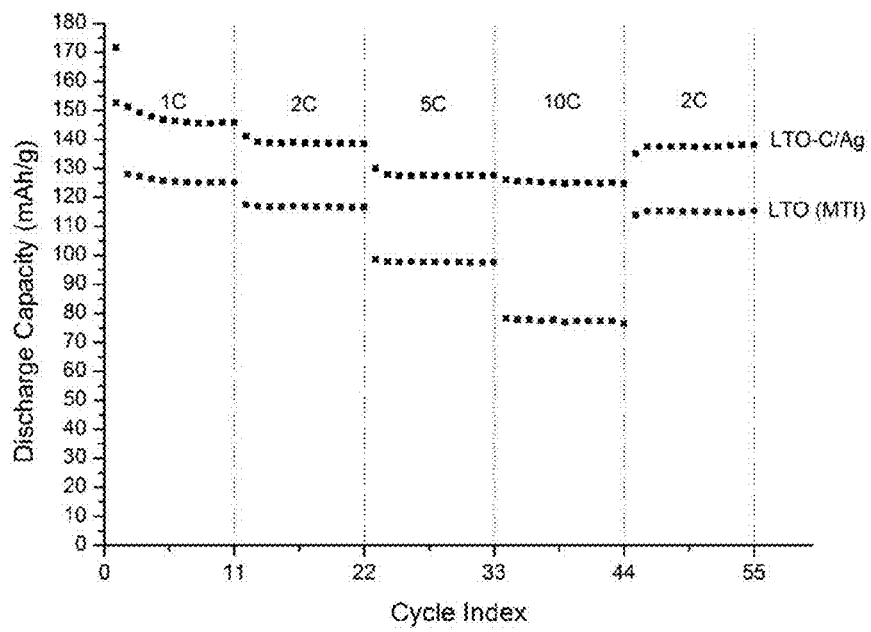
FIG. 7C shows the electrical performance regarding the discharge capacity at different rates of C, including 1 C, 2 C, 5 C, 10 C, between the Ag/C co-doped LTO microspheres of the example 1 and the commercial LTO material respectively.

FIG. 7C shows the electrical performance regarding the discharge capacity at different rates of C, including 1 C, 2 C, 5 C, 10 C, between the Ag/C co-doped LTO material and the commercial LTO material respectively. The test was performed under the charge/discharge condition using an electrolyte. The result shows that the discharge capacity of the Ag/C co-doped LTO material is higher than that of the commercial LTO material, especially at the rate of 10 C.

It is shown in the results that the electrodes made from the LTO material of the present invention exhibit higher electronic conductivity, excellent high rate capability and cycling performance, providing promising application in high-rate lithium ion batteries. Such intriguing observations also verify that both the structure and conductivity of the active material in the electrode play important roles in delivering high capacities and rate capabilities.

EXAMPLE 2

A silver/nitrogen (Ag/N) co-doped LTO material was fabricated in Example 2. 1.92 g tetrabutyl titanate was dissolved in 48 ml anhydrous ethanol under stiffing to form a solution A. 4.0 g Lithium acetate dihydrate and 0.75 g urea were dissolved in 48 ml anhydrous ethanol using a magnetic stirrer to form a solution B. The above two solutions were mixed under stiffing for 10 minutes. And then, the mixture was transferred into a TEFLON-lined autoclave and kept at a pressure of 1.5-5 atm and 180° C. for 24 hours. The resulting precipitate was separated by centrifugation, and washed 3 times with deionized water. The precipitate was dried at 80° C. for 6 hrs. The precipitate was grinded into fine powder and calcinated at 600° C. for 4 hr in a tube furnace under nitrogen atmosphere to obtain N-doped LTO microspheres with the heating rate of 1° C./min. Then the as-prepared powder of N-doped LTO microspheres was immersed in 2.5 wt % of $AgNO_3$ DI water solution and followed by stiffing and vacuum drying at 80° C. The powder was calcinated at 600° C. for 4 hr in a tube furnace under nitrogen atmosphere to obtain Ag/N co-doped LTO material with the heating rate of 1° C./min.

Figure 8A:
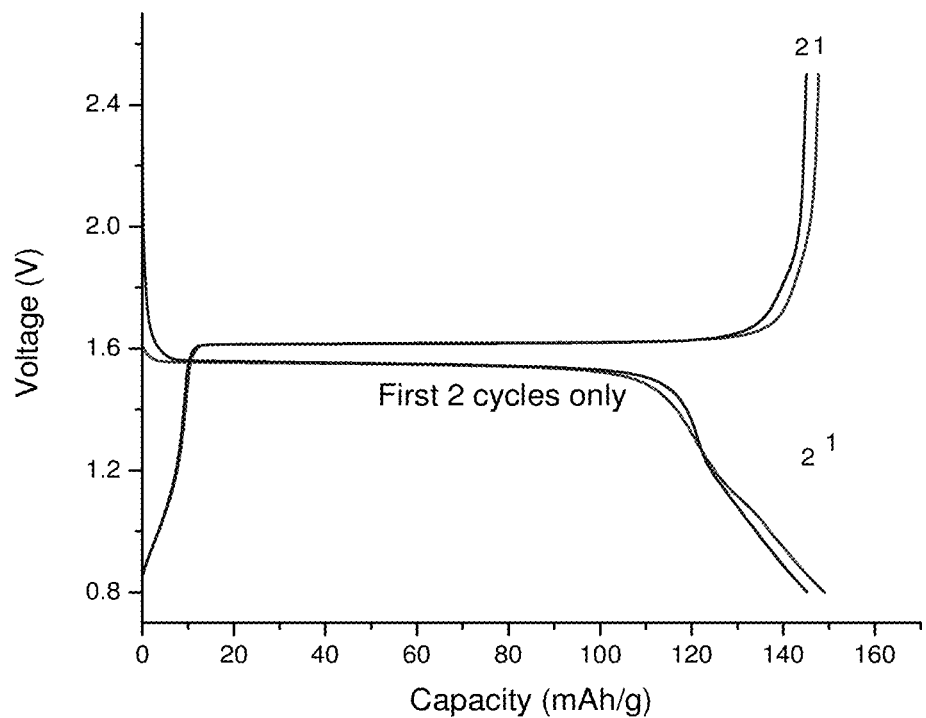
FIG. 8A-B show the electrochemical performances regarding charge/discharge capacity of the Ag/N co-doped LTO microspheres at 1 C and 10 C respectively.
Figure 8B:
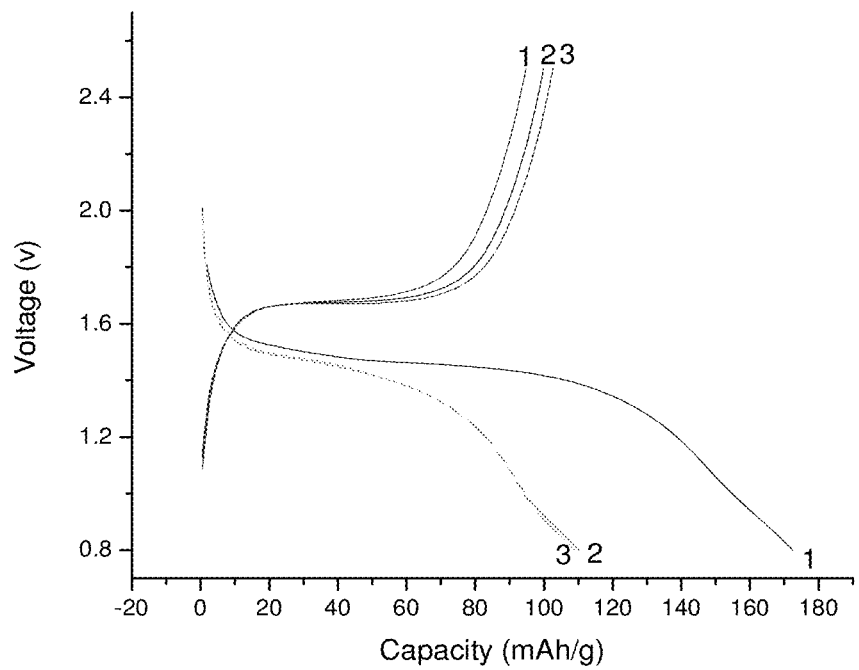

FIG. 8A-B show the electrochemical performance regarding charge/discharge profiles of the Ag/N co-doped LTO material of the example 2 under 1 C and 10 C respectively. As shown in FIG. 8A, at the rate of 1 C, the Ag/N co-doped LTO material gives a discharge capacity of about 150 mAh/g. As shown in FIG. 8B, at the rate of 10 C, the Ag/N co-doped LTO material gives a discharge capacity of about 170 mAh/g.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for fabricating a metal and non-metal co-doped lithium titanate (LTO) material, comprising:
   mixing at least one titanium (Ti) containing precursor, at least one lithium (Li) containing precursor, and at least one non-metal dopant precursor in at least one solvent to form a mixture;
   hydrothermally heating the mixture under a pressure ranging from 1.5 to 5 atm, and a heating temperature ranging from 120 to 200° C. to form nano-sized primary LTO particles, wherein one or more of the nanosized primary LTO particles are encapsulated by at least one layer of non-metal dopant;

calcining the nano-sized primary LTO particles at a first calcination temperature ranging from 450 to 750° C. to form micron-sized secondary LTO spheres;

immersing the micron-sized secondary LTO spheres into at least one metal dopant containing solution to incorporate at least one metal dopant into the micron-sized secondary LTO spheres;

drying the micron-sized secondary LTO spheres incorporated with the metal dopant in vacuum; and calcining the micron-sized secondary LTO spheres incorporated with the metal dopant at a second calcination temperature ranging from 450 to 750° C. to form the LTO material.

2. The method of claim 1, wherein the solution comprises 1-7 wt % of the Ti containing precursor, 4-10 wt % of the Li containing precursor, 80-92 wt % of the solvent, and 1-10 wt % of the non-metal dopant precursor.

3. The method of claim 1, wherein the Ti containing precursor is tetrabutyl titanate, and the Li containing precursor is lithium acetate dehydrate.

4. The method of claim 1, wherein the non-metal dopant precursor is a carbon source, or urea.

5. The method of claim 1, wherein the non-metal dopant is carbon, nitrogen, or fluorine.

6. The method of claim 1, wherein the metal dopant containing solution comprises one or more ions of copper, nickel, cobalt, manganese, gold, platinum, iron, and/or tin.

7. The method of claim 1, wherein the step of calcinating the nano-sized LTO primary particles further comprises:
calcining the nano-sized primary LTO particles in a tube furnace under nitrogen atmosphere; and
heating the nano-sized LTO primary particles to the first calcination temperature at a first heating rate in a range of 0.5 to 5° C./min.

8. The method of claim 7, wherein the step of calcining the micron-sized LTO secondary spheres further comprises:
calcining the micron-sized secondary LTO spheres in a tube furnace under nitrogen atmosphere; and
heating the micron-sized LTO secondary spheres to the second calcination temperature at a second heating rate in a range of 0.5 to 5° C./min.

9. The method of claim 1, further comprising after the step of hydrothermally heating the mixture:
drying the nano-sized primary LTO particles; and
grinding the nano-sized primary LTO particles.

* * * * *